United States Patent
Nagata et al.

(10) Patent No.: US 7,929,845 B2
(45) Date of Patent: Apr. 19, 2011

(54) PLAYBACK APPARATUS AND PLAYBACK METHOD

(75) Inventors: Masahiko Nagata, Kanagawa (JP); Kenji Tanaka, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1037 days.

(21) Appl. No.: 11/785,158

(22) Filed: Apr. 16, 2007

(65) Prior Publication Data
US 2007/0286570 A1    Dec. 13, 2007

(30) Foreign Application Priority Data
May 9, 2006    (JP) .................. 2006-130123

(51) Int. Cl.
H04N 5/783    (2006.01)

(52) U.S. Cl. ....................... 386/350; 386/351

(58) Field of Classification Search .................. 386/200, 386/241, 332, 344, 350, 351
See application file for complete search history.

(56) References Cited

U.S. PATENT DOCUMENTS
6,928,037 B1 *    8/2005    Maier et al. ................. 369/47.28
2005/0141863 A1    6/2005    De Haan FOREIGN PATENT DOCUMENTS
JP    2005-521189 A    7/2005
* cited by examiner

*Primary Examiner* — Huy T Nguyen
(74) *Attorney, Agent, or Firm* — Foley & Lardner LLP

(57) ABSTRACT

A playback apparatus includes a VOBU number retriever for obtaining the number of VOBU included in a title, a playback time retriever for obtaining playback time for the title and a playback controller for carrying out a special playback according to the number of VOBU and the playback time. The playback controller obtains average playback time for one VOBU from the playback time and number of VOBU for the title as unit playback time and refers to an address map of a VOBU according to the unit playback time to execute a high-speed search and time search.

20 Claims, 19 Drawing Sheets

PLAYBACK APPARATUS AND PLAYBACK METHOD

BACKGROUND OF THE INVENTION

1. Field of the Invention

The present invention relates to a playback apparatus and a playback method to play data recorded on a DVD (Digital Versatile Disk) or the like, and particularly to a playback apparatus and a playback method capable of carrying out special playbacks such as a high-speed and time search.

2. Description of Related Art

Program streams on a DVD video are managed on a VOBS (Video Object Set) basis, where the unit is for example a movie. The VOBS is made up of a plurality of VOBs (Video Object). The VOBS is a unit in which each data is recorded as one group on a disk. The VOB is made up of a plurality of cells, where the cell is for example one scene or clip in a movie. Moreover, the cell is made up of a plurality of VOBUs (Video Object Unit). The VOBU is 0.4 to 1.2 second unit and one or more GOP (Group of Picture) in MPEG2 format is included in a VOBU.

A VOBU has a navigation pack (N_PCK) having management information of the VOBU and the navigation pack is placed at the beginning of each VOBU. A navigation pack has VOBU_SRI (VOBU Search Information) and SP_SYNCA, and VOBU_SRI has a start address of a VOBU that is played before and after the playback time of VOBU including the VOBU_SRI for N seconds. Further, SP_SYNCA had address information of a subpicture that is synchronized with a video of VOBU having the SP_SYNCA to be played. To play a movie or the like, the navigation pack is previously read in so as to play according to the management information indicated by the navigation pack.

By the way, to carry out a time search (time specified playback) or high-speed search (forward/backward) on a DVD+RW having such data configuration, it is normally performed as follows. FIG. 12 is a view showing a data configuration of search information DSI. FIGS. 13 and 14 are views explaining a conventional high-speed searching method. FIG. 15 is a view explaining a high-speed searching method when VOBU_SRI crosses over cells. In this document, playbacks other than normal playbacks including a time search and high-speed search is referred to as a special search hereinafter.

As information defined in the DVD+RW standard used to perform these special playbacks (searching process), there is VOBU search information (VOBU_SRI) described in data search information (DSI) that is included in an navigation pack, as shown in FIG. 12. In the VOBU search information, search information up to BWDI_240 in the past direction and to FWDI_6 in the future direction exists. Accordingly assuming that playback time of one VOBU to be 0.5 second, VOBU start address up to 120 seconds before in the past direction and VOBU start address up to 3 seconds ahead in the future direction are described.

Forward/backward speed is determined by the number of skipping VOBU and the number of displaying sheet for one picture. Thus skipping many VOBUs or reducing display sheets increases the speed of searching. However the displaying sheets cannot be reduced extremely in relation to the appearance and decode processing time, thus the speed is practically determined by how much VOBUs are skipped to play.

However in the DVD+RW as shown in FIG. 13, for VOBU search information (VOBU_SRI), information up to only FWDI_6 (3 seconds ahead) exists in the future direction. Thus address cannot be skipped more than that in the future direction. Accordingly to carry out a high-speed search, the address is skipped to the farthest VOBU information (FWDI_6) in the future direction to obtain again search information from a disk corresponding to the VOBU and a high-speed search is accomplished by repeating the operation to skip to the farthest VOBU information (FWDI_6) in the future direction again according to the obtained data. Thus to realize the searching process only with the search information (DSI) defined in the DVD+RW standard, assuming that a unit playback time for one VOBU is 0.5 second and the number of frame making up one VOBU is 15 frames, the searching speed of a high-speed search can practically be increased up to 20×-speed for a forward.

Therefore, to accomplish 100×-speed as a normally common high-speed search, abovementioned 20×-speed may be repeated for 5 times as shown in FIG. 14. However there is a problem in this way that the process is complicated and takes more time.

Further, to carry out a time search only with the search information (DSI) defined in the DVD+RW the VOBU information (FWDI_6) in the farthest future direction in the search information is read out from the first VOBU of a title. Then the process to obtain again search information corresponding to the VOBU from a disk is overlapped. The method is to find a specified time by accumulating the time in this way. This method requires to search for future information before the high-speed search, thus it is not realistic to accomplish only with the data search information (DSI).

Furthermore, to accomplish searching process such as a high-speed search and time search only with the search information (DSI) defined in the DVD+RW standard, as shown in FIG. 15, the search information is cut off in the boundary between cells making up a title. Thus to carry out a search crossing over cells, a recalculation is needed, thereby complicating the computation process.

As discussed above, to accomplish a searching process such as a time search and high-speed search only with the search information (DSI) defined in the DVD+RW standard, there is no other method to find a specified time but to overlap the process to obtain again search information from a disk so as to accumulate time. There is another problem that this causes to complicate the process.

To overcome these problems, a method is disclosed in Japanese Unexamined Patent Application Publication No. 2005-521189 that a high-speed search is carried out using video title set video object unit address map VTS_VOBU_ADMAP. FIGS. 16 to 18 are views explaining the method of high-speed search disclosed in Japanese Unexamined Patent Application Publication No. 2005-521189. FIG. 5 is a view explaining VTS_VOBU_ADMAP.

In the technique disclosed in Japanese Unexamined Patent Application Publication No. 2005-521189, a special playback is carried out by calculating playback of each VOBU that does not exist in the standard. Specifically as shown in FIG. 16, a start address (C_FVOBU_SA) of a first VOBU and a start address (C_LVOBU_SA) of a last VOBU of a playback cell (C_PBI#m) in a playback information table (C_PBIT) that is included in program chain information (PGCI) are obtained in relation to a cell currently being played. Then VTS_VOBU_ADMAP shown in FIG. 5 is referred from the start/last VOBU address information of the cell to calculate the number of VOBU in the cell. Moreover, cell playback time (C_PBTM) in the cell playback information table (C_PBIT) is obtained and divided by the number of VOB calculated as in the foregoing so as to obtain the playback time for one VOBUS in a cell currently being played.

Specifically as shown in FIG. 17, VOBU number m is read out from the address of the start address C_FVOBU_SA of the first VOBU of a cell and VOBU number n is read out from the start address C_LVOBU_SA of the last VOBU of a cell in order to calculate the number or VOBUs (n-m) in the cell. Then playback time t3 for one VOBU is calculated by cell playback time C_PBTM/(n-m).

After that as shown in FIG. 18, a high-speed search is carried out using the playback time t3. For example a case is described hereinafter in detail where the unit average time t3 for one VOBU is 0.5 second and the number of frame in one VOBU is 15. One second is made up of 30 frames. With an instruction for a 5× high-speed search, when 6 frames are displayed for one playback, to accomplish 5× speed, it needs to be played once in 2 VOBUs (30 frames). That is, 5×-speed playback is carried out by playing 30 frames by 6 frames. In such case, assuming that VOBU number currently being played to be #n, VOBU is accessed in the order of: #n+2, #n+4, #n+6 . . . and played by 6 frames each. Accordingly the playback controller 30 obtains addresses #n+2, #n+4, #n+6 by referring to VTS_VOBU_ADMAP to carry out a high-speed search.

Likewise, to accomplish 10×-speed by displaying 6 frames for one playback, it needs to be played once in 4 VOBUs (which is 60 frames). Further to accomplish 30× speed by playing 4 frames in one playback, it needs to be played by 8 VOBUs (which is 120 frames). Likewise, to accomplish 50× and 100× speeds by playing 4 frames, it needs to be played by 13 VOBUs (which is 195 frames) and 27 VOBUs (which is 405 frames) respectively.

Here in Japanese Unexamined Patent Application Publication No. 2005-521189, to obtain playback time for one VOBU, it is performed for a cell currently being played. This means that to obtain playback time for one VOBU, PGCI for full title is referred when playing full title and PGCI for play list title is referred when playing play list title.

However it has now been discovered that there is a following problem occurred in the technique disclosed in Japanese Unexamined Patent Application Publication No. 2005-521189 because the technique assumes that PCGI has always correct information in relation to a searching for a play list title. That is, for a play list title, it is not a problem even if correct PGCI is not recorded as a standard. If PCGI is different from an actual title, information (PL match) indicating the difference is added. FIG. 19 is a view explaining a PL match. A PL match is described in a PL match in a record mode (REC_MODE) of VRMI recording information (VRMI_RECI) of video recording management information (VRMI). If PGCI of play list title is invalid, the information indicating the invalid PGCI is written in the PL match.

There is a problem in the technique disclosed in Japanese Unexamined Patent Application Publication No. 2005-521189 that when playing a play list title with incorrect PL match, search process cannot be carried out. Especially for the DVD+VR standard, the abovementioned problem becomes pronounced as the play list title is used more than full title.

SUMMARY OF THE INVENTION

According to an aspect of the present invention, there is provided a playback apparatus that includes a playback unit number retriever to obtain the number of playback unit included in a title recorded on a media and a playback controller to carry out a special playback according to the number of playback unit and the playback time. The playback controller obtains average playback time for the playback unit according to the playback time and the number of playback unit for the title as unit playback time to carry out a special playback according to the playback time.

According to another aspect of the present invention, there is provided a playback apparatus that includes a playback time retriever to obtain playback time for a playback unit in a title recorded on a media and count playback time for one or more playback unit and a playback controller to carry out a special playback according to the result of the playback time retriever. The playback controller carries out the special playback based on unit playback time which is the unit playback time being playback time for one playback unit counted by the playback time retriever.

In the present invention, unit playback time is calculated from playback time of a title and the number of playback unit included in the title. Alternatively the unit playback time is calculated by counting the playback time. Thus special playbacks of a media not having information of playback unit time as in DVD+RW can be accomplished.

Accordingly the present invention provides a playback apparatus and a playback method enabling a special playback by correctly estimating playback time for each playback unit.

BRIEF DESCRIPTION OF THE DRAWINGS

The above and other objects, advantages and features of the present invention will be more apparent from the following description taken in conjunction with the accompanying drawings, in which.

Likewise.

Likewise.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

This embodiment is that the present invention is incorporated to a special playback method for a time search and high-speed search in a playback apparatus complying with the DVD+RW standard. In this embodiment, it will be explained referring to the DVD+RW standard as necessary, however the playback apparatus is not limited to the one complied to the DVD+RW standard but may be effective when carrying out a special playback for a recording medium not having playback time information of smallest playback unit, for example.

Figure 1:
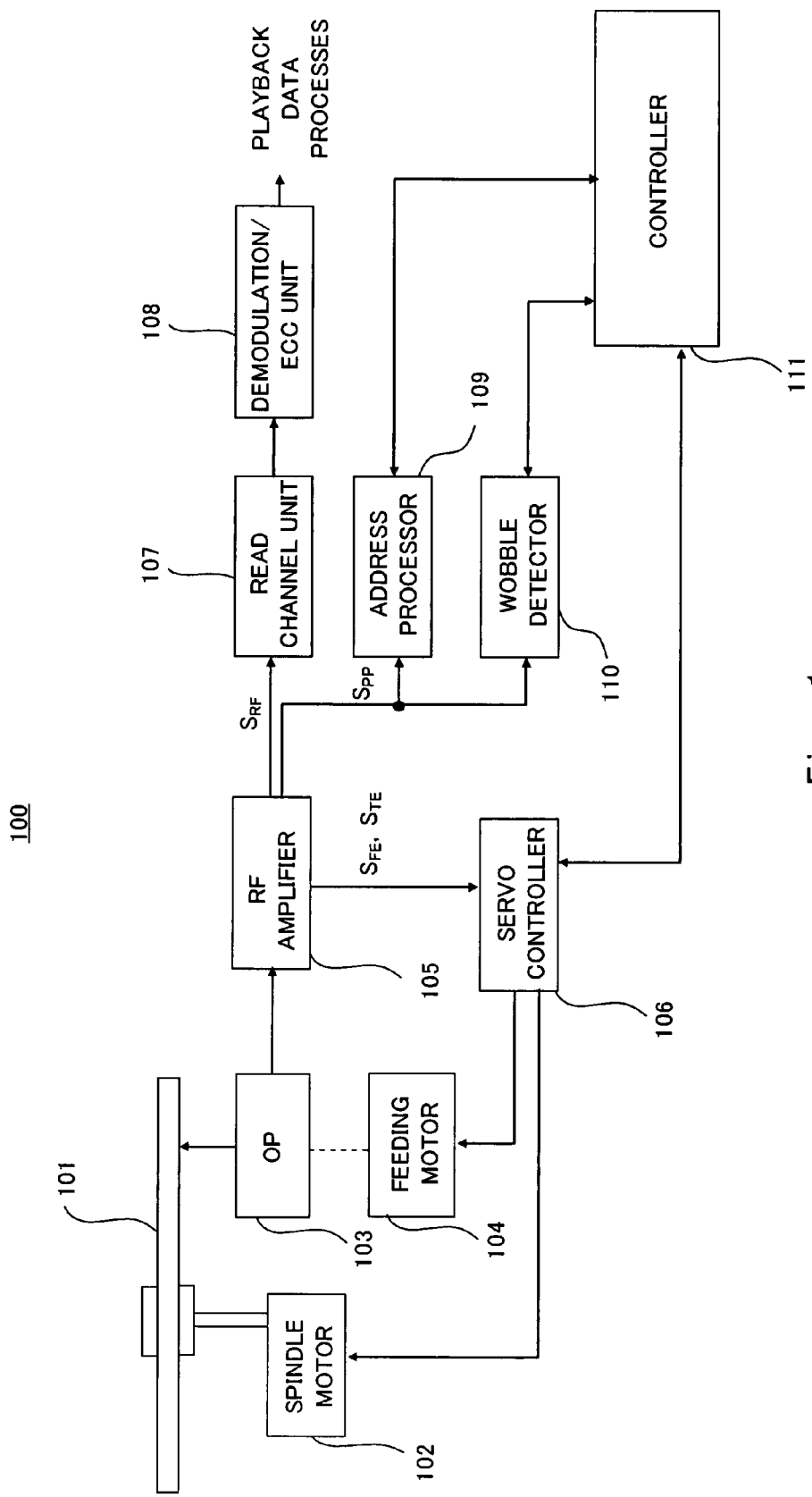
FIG. 1 is a view showing a playback apparatus according to an embodiment of the present invention.

An outline of the playback apparatus is described first. FIG. 1 is a view showing apart of the configuration of the playback apparatus according to the embodiment of the present invention. The playback apparatus 100 includes a spindle motor 102 for rotatingly driving an optical disk 101 mounted thereto, an optical pick-up 103 constituted of a semiconductor laser, an objective lens and a photo director or the like, and a feeding motor 104 for moving the optical pick-up 103 radially toward the optical disk 101. In this case, a laser beam irradiated from the semiconductor laser of the optical pickup 103 is reflected on a recording surface of the optical disk 101 and the reflected light is detected by the photo director constituting the optical pick-up 103.

Further, the optical disk apparatus 100 includes a controller 111 for controlling the operation of the entire drive per se and a servo controller 106. The servo controller 106 controls tracking and focus in the optical pick-up 103 and controls the operation of the feeding motor 104. Moreover, the servo controller 106 controls the rotation of the spindle motor 102.

The optical disk apparatus 100 further includes a RF amplifier 105 for processing an output signal from the photo director constituting the optical pick-up 103 to generate a playback RF signal $S_{RF}$, focus error signal $S_{FE}$, tracking error signal $S_{TE}$ and push pull signal $S_{PP}$. The focus error signal $S_{FE}$ and tracking error signal $S_{TE}$ are supplied to the servo controller 106. The servo controller 106 controls tracking and focus in the optical pick-up 103 using these error signals.

Furthermore, the optical disk apparatus 100 includes a read channel unit 107 for carrying out a series of analog signal processes including binarized slicing the playback RF signal $S_{RF}$ generated by the RF amplifier 105 and generating synchronous data by a signal generation circuit (Phase-Locked Loop) thereafter and a demodulation/ECC unit 108 for demodulating the synchronous data generated by the read channel unit 107 and performing processes such as an error correction thereafter. Output data from the demodulation/ECC unit 108 is supplied to a playback data processor not shown.

The optical apparatus 100 further includes an address processor 109. The address processor 109 transfers address information extracted by the read channel unit 107 from the playback RF signal $S_{RF}$ to the controller 111. The address processor 109 processes the push pull signal $S_{PP}$ to obtain address information and then transfers the address information obtained from the push pull signal to the controller 111. Additionally the optical disk apparatus 100 includes a wobble detector 110 for detecting a wobble signal from the push pull signal $S_{PP}$ generated by the RF amplifier 105.

The controller 111 is connected to the servo controller 106 or the like to receive instructions from a user or a host computer. Therefore the controller 111 includes a microprocessor and a memory or the like to carry out an usual control procedure.

Figure 2:
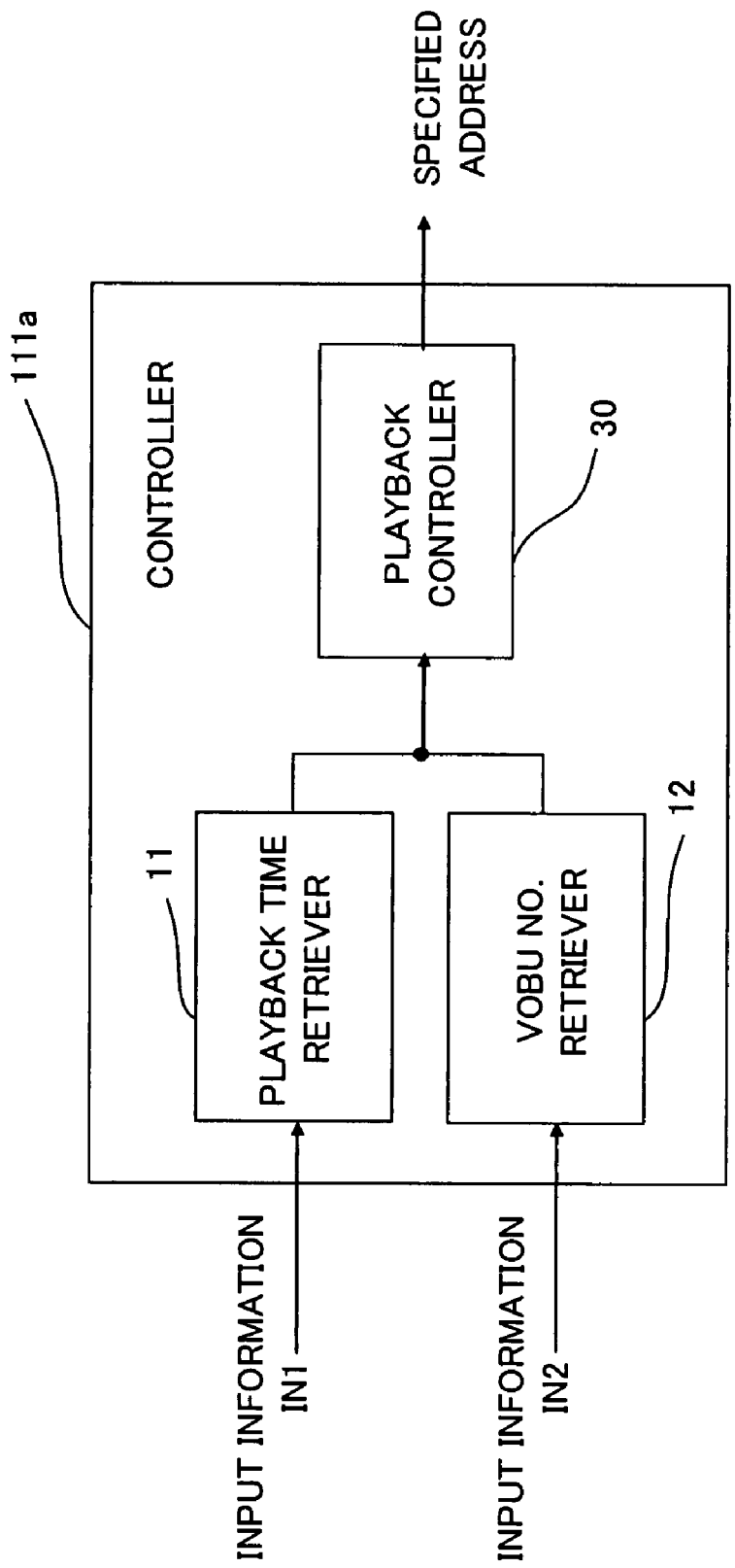
FIG. 2 is a view showing an example of a controller according to the embodiment of the present invention.

The controller of this embodiment is described hereinafter in detail. FIG. 2 is a view showing an example of the controller according to this embodiment. A controller 111a includes a playback time retriever, VOBU number retriever 12 as a playback unit number retriever and playback controller 30. In this embodiment, a search is carried out using information of video title set video object unit address map (VTS_VOBU_ADMAP) inside video title set information (VTSI), which is different from data search information. All addresses of VOBU exist in a target video title are sequentially stored in VTS_VOBU_ADMAP, so that VOBU in the title can easily be searched. However, as the information is not purposed for searching processes, playback time of each VOBU does not exist anywhere as a standard. Thus it is not possible to assess how much time has passed from which VOBU and the searching process cannot be carried out only with this information.

Therefore, the playback time of VOBU needs to be estimated. Accordingly in this embodiment, two methods are performed as methods for estimating the playback time of VOBU. Note that as described later in detail, the playback time of VOBU may be obtained using either of the methods. Since the DVD+RW standard is a recording and playing standard, a video is basically configured in advance to encode real-time so as to record. It is not realistic to vary playback time for each VOBU at a recording in the title, thus the playback time for one VOBU in one title is constant. Accordingly, the playback time for each VOBU can be obtained by calculating an average playback time for one VOBU.

A first method is to obtain playback time of a title to be played and the number of all VOBU (playback time/number of all VOBU) to calculate playback time for each VOBU. Therefore the playback time retriever 11 receives PGC playback time (PGC_PB_TM) as input information IN1, where the PGC playback time is included in program chain general information (PGC_GI) of full title program chain information PGCI so as to obtain playback time for full time. On the other hand, the VOBU retriever 12 firstly obtains a start and an end address of a VOBU in the title as input information IN2. That is, the start address (C_FVOBU_SA) of the VOBU is obtained as a first address included in first cell information (C_PBI#1) of cell playback information table (C_PBIT) of full title program chain information (PGCI). Further, a start address (C_LVOBU_SA) as a second address of a last VOBU included in last cell information (C_PBI#n) is obtained as the input information IN2. Next, VTS_VOBU_ADMAP is referred by the start/end address information of the full title to obtain VOBU number. This is how the number of VOBU included in full title is calculated.

The playback controller 30 obtains playback time for each VOBU by dividing the playback time in full time obtained by the playback time retriever 11 by the number of VOBU obtained by the VOBU number retriever 12. After obtaining the playback time for one VOBU, how farther VOBU to skip to is calculated and the address can be obtained from VTS_VOBU_ADMAP. In this way, in the playback apparatus, the playback time retriever 11 and VOBU number retriever 12 are able to obtain the playback time and the number of VOBU only with information definitely exists as the DVD+RW standard to enable special playback.

Next, as a second method for estimating playback time of VOBU, the playback time of VOBU is estimated from the information played up to then. Specifically, the playback time retriever 11 includes a playback time counting means for counting playback time from playback start to the current time according to an instruction to start counting supplied from the input IN1. The VOBU number retriever 12 includes a VOBU number counting means for counting the number of VOBU played up to then according to an instruction to start counting supplied from the input IN2. The playback controller 30 calculates playback time (average value) for each VOBU according to the playback time counted by the playback time retriever 11 and the number of playback VOBU counted by the VOBU number retriever 12 so as to carry out a high-speed search and time search.

Here the playback controller 30 may obtain the playback time (hereinafter referred to as unit playback time) for one VOBU by either of the methods. In this embodiment, as an illustrative case, a controller is explained in which when carrying out a time search, PGC playback time (PGC_PB_TM) and a unit playback time is obtained according to a start and an end address of a VOBU in a title, and when carrying out a high-speed search, a unit playback time is obtained according to the playback time and the number of playback VOBU up to then.

Figure 3:
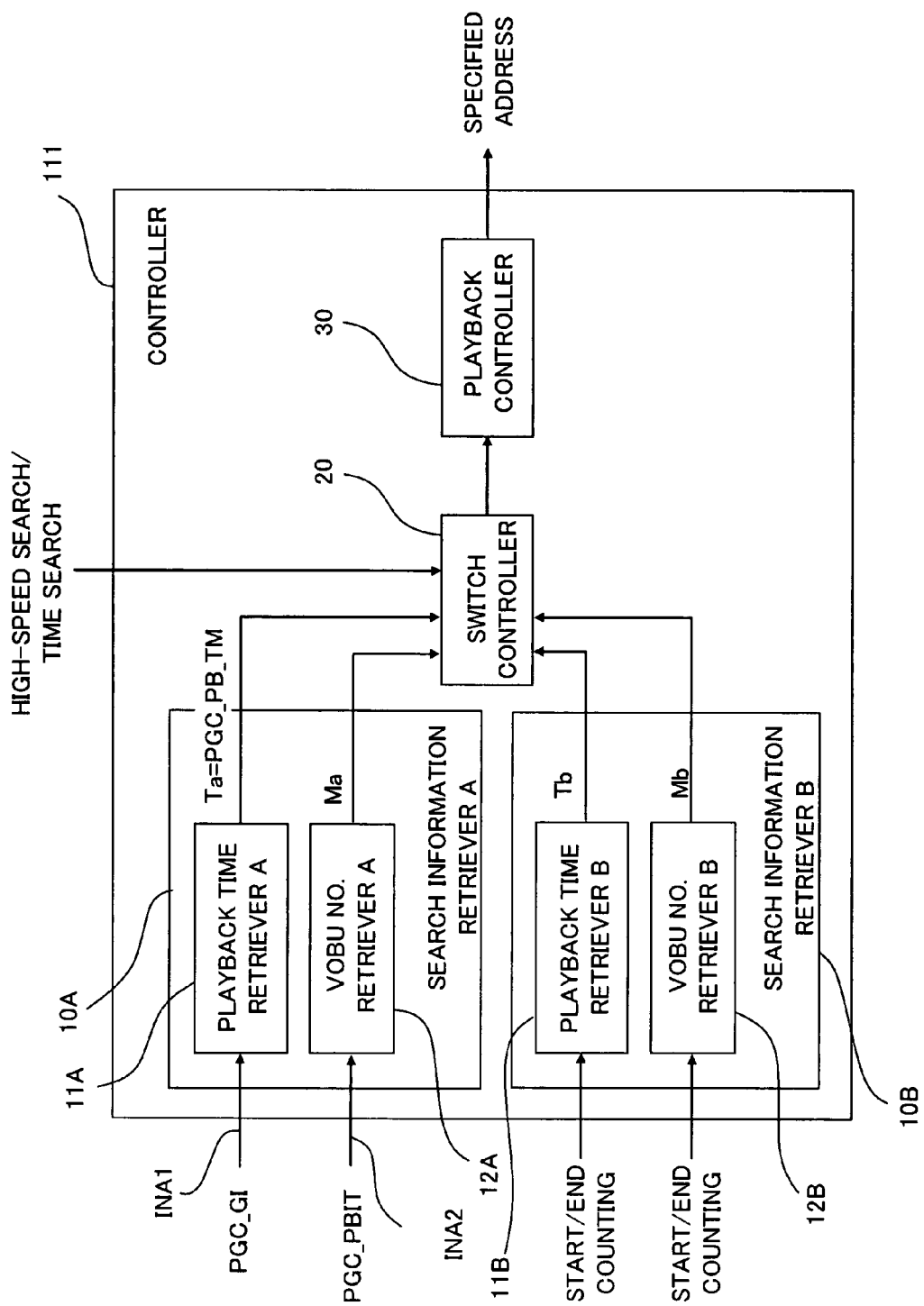
FIG. 3 is a view showing an illustrative case of the controller according to the embodiment of the present invention.

FIG. 3 is a view showing a controller of this illustrative case. The controller of this illustrative case includes a search information retriever A (10A), search information retriever B (10B), a switch controller 20 and a playback controller 30. The search information retriever 10A includes a playback time retriever A (11A) and a VOBU number retriever A (12A). The search information retriever 10B includes a playback time retriever B (11B) and a VOBU number retriever B (12B).

In this example, for a time search, the search information retriever 10A is used whereas for a high-speed search, the search information retriever 10B is used. Accordingly the playback time retriever 11A obtains PGC playback time (PGC_PB_TM) and outputs as time information Ta. The VOBU number retriever 12A obtains the number of VOBU included in a title and outputs VOBU number information Ma. On the other hand, the playback time retriever 11B and VOBU number retriever 12B each includes a counting means for counting playback time and the number of playback VOBU from the playback start to the current time and outputting as time information Tb and VOBU number information Mb.

The switch controller 20 inputs to input to the playback controller 30, which is to select an output of the search information retrievers 10A or 10B according to the information of the time search or high-speed search from a user. The playback controller 30 calculates the unit playback time by (Ta/Ma) or (Ta/Ma) to carry out a special playback such as a time search or high-speed search.

Note that as the time search is carried out while a title is not played (paused) at any playback position, the high-speed search is played immediately before that. The screen display while the title is not played is configured in advance, for example blue screen or menu screen of a player-itself for the playback apparatus. Incidentally, television broadcasting screen and playback menu or the like can be displayed for record and playback apparatus. Thus in this example, a time search is carried out according to the information from the search information retriever 10A. For a high-speed search that is performed during playback, it is explained that the high-speed search is carried out according to the information from the search information retriever 10B. However as described in the foregoing, the searches can be carried out by either of the information. Specifically, as the search information retriever 10A is able to obtain unit playback time whether or not during playback, it is needless to say that a high-speed search can be carried out using the information obtained by the search information retriever 10A. Further the search information retriever 10B is able to calculate the unit playback time only by obtaining playback time for one VOBU. Thus the playback controller 30 is able to obtain unit playback time even not during playback but with the playback time for one VOBU for about 0.5 second and a time search can be carried out. When obtaining unit playback time by counting only the playback time of one VOBU, the VOBU number retriever 12B is not required. Moreover, as the search information retriever 10B calculates the unit playback time by measuring actual playback time, unit playback time can be obtained more accurately.

Further in this example, a case is described in which the search information retrievers 10A and 10B are provided and controlled by the switch controller 20 for clarity of explanation, however one search information unit may be used in common. Additionally in this embodiment, the search information retrievers 10A and 10B, switch controller 20 and playback controller 30 are explained with the block diagram. However processes of each block can be accomplished by a CPU (Central Processing Unit) executing computer programs.

Figure 4:
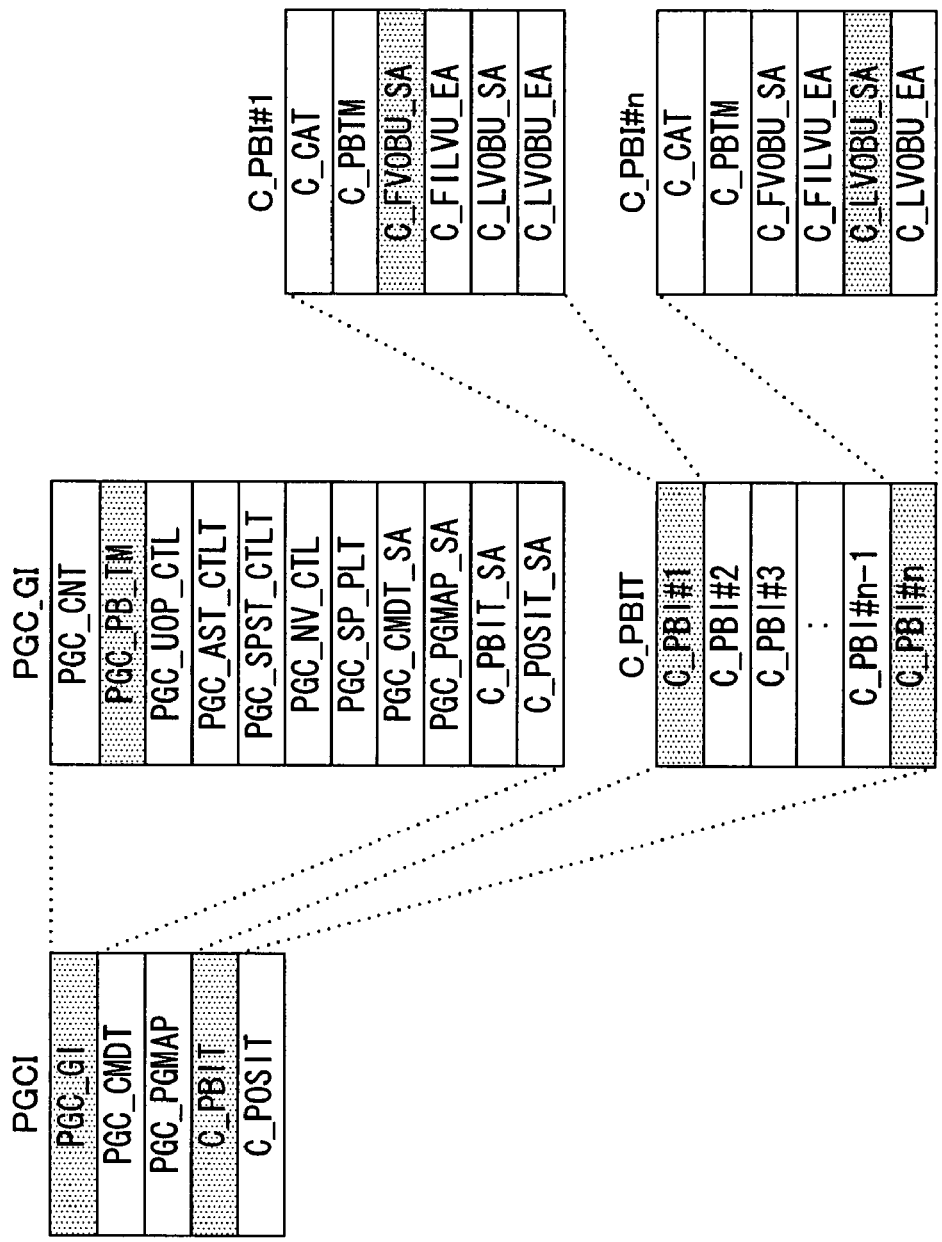
FIG. 4 is a view showing a data configuration of program chain information PGCI.
Figure 5:
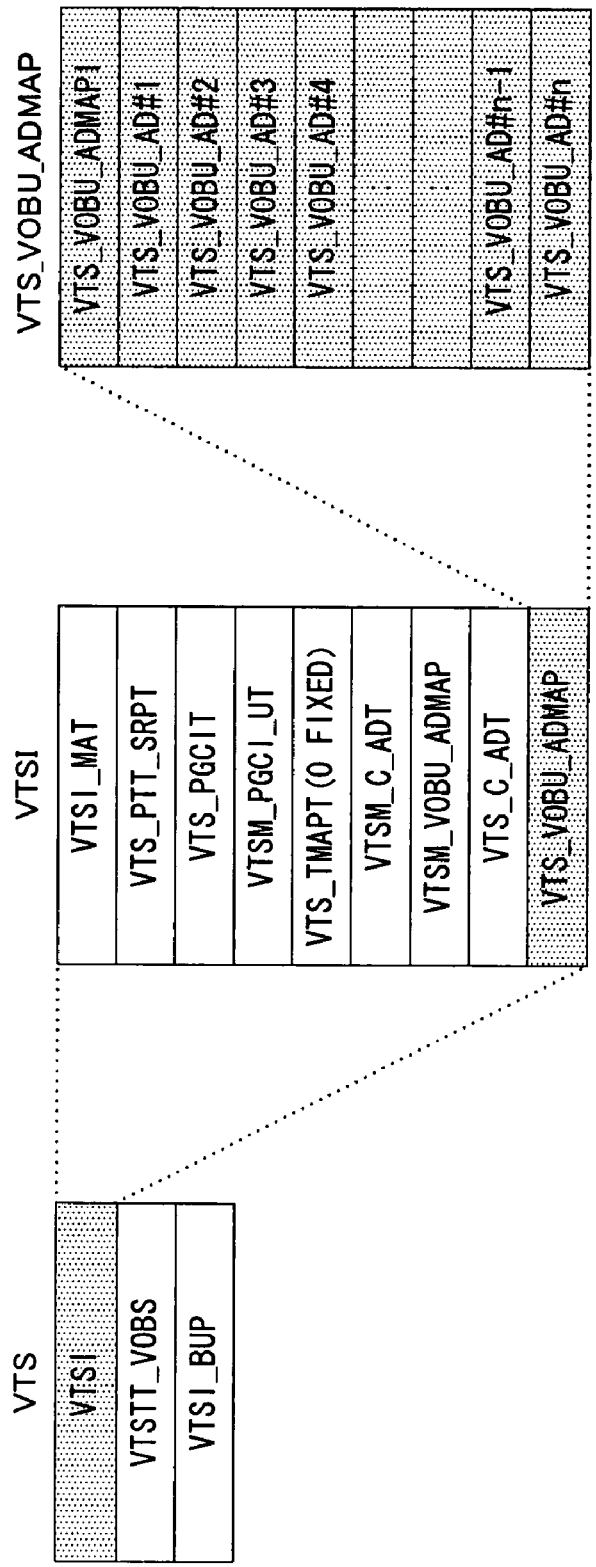
FIG. 5 is a view showing a configuration of video title set information VTSI.
Figure 6:
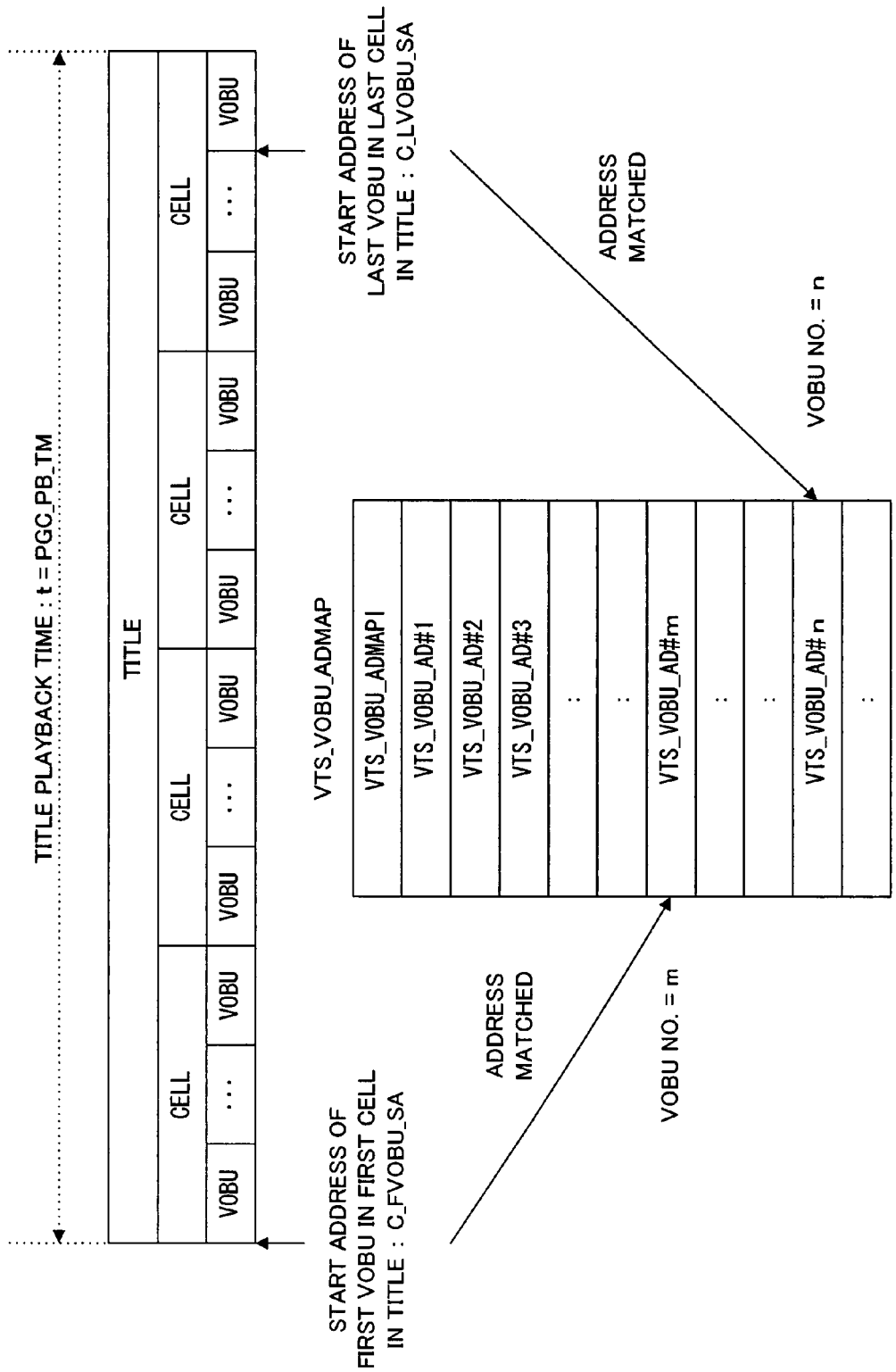
FIG. 6 is a view explaining a start address C_FVOBU_SA of a first VOBU of a first cell in a title and a tart address C_CLVOBU_SA of a last VOBU of a last cell in the title.
Figure 7:
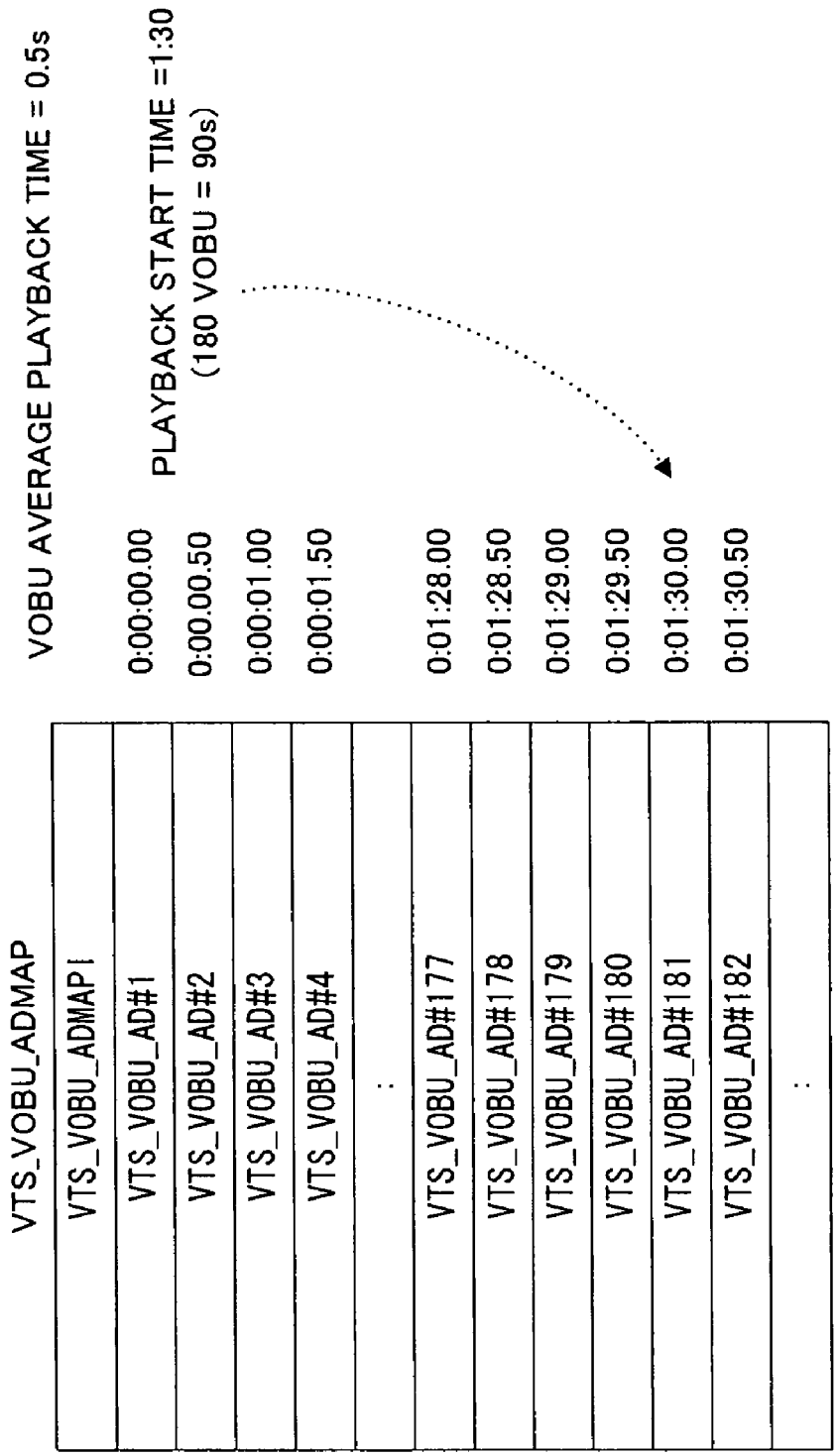
FIG. 7 is a view explaining a time search using a unit playback time.
Figure 8:
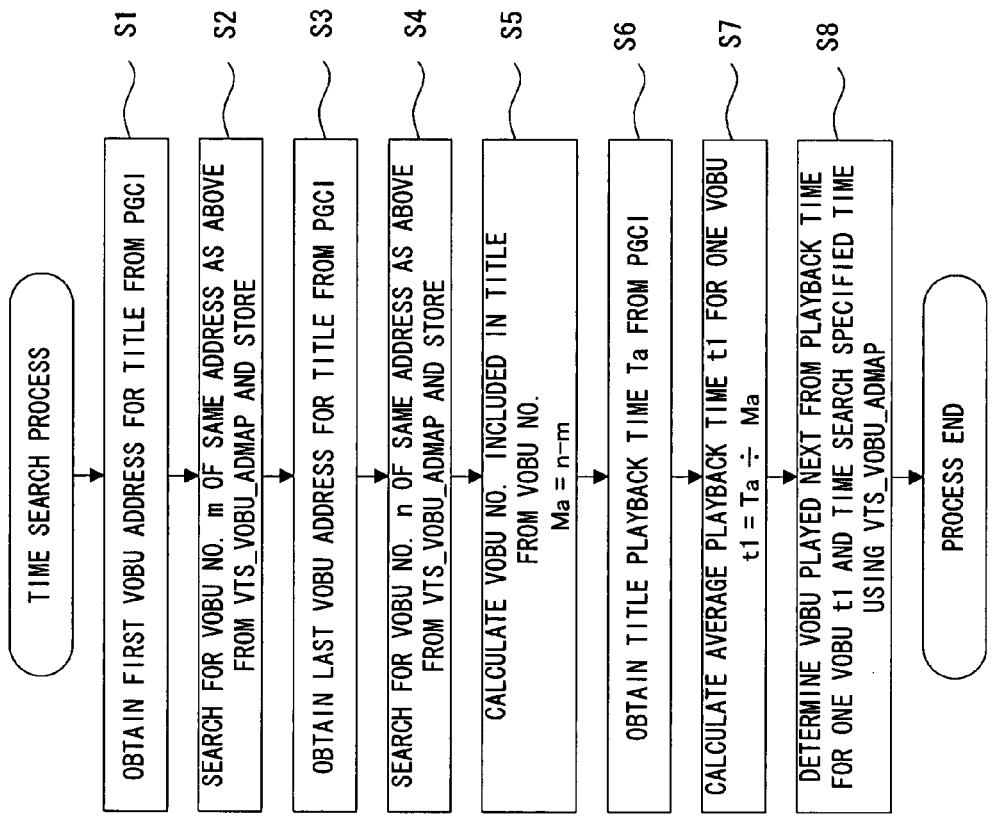
FIG. 8 is a flowchart illustrating a method of time search according to the embodiment of the present invention.

Details of the search information retrievers 10A and 10B are described hereinafter in detail. Firstly a method of time search is described hereinafter in detail with reference to FIGS. 3 to 8. FIG. 4 is a view showing a data configuration of program chain information PGCI. FIG. 5 is a view showing a configuration of video title set information VTSI. Further FIG. 6 is a view explaining a start address C_FVOBU_SA of a first VOBU of a first cell in a title and a start address C_CLVOBU_SA of a last VOBU of a last cell in the title. FIG. 7 is a view explaining a time search using unit playback time. FIG. 8 is a flowchart illustrating a method of time search. In this example, for a time search, the search information retriever 10A, switch controller 20 and playback controller 30 are used.

The VOBU number retriever 12A firstly obtains a start address (C_FVOBU_SA) of a first VOBU (hereinafter referred to as a first VOBU address) from first cell information (C_PBI#1) in cell playback information table (C_PBIT) of the program chain information PGCI shown in FIG. 4. Further, a start address (C_LVOBU_SA) of a last VOBU (hereinafter referred to as a last VOBU address) is obtained from last cell information (C_PBI#n) in the cell playback information table (C_PBIT) (steps S1 and S3).

To explain the program chain information PGCI here, other than program chain general information (PGCI_GI) and cell playback information (C_PBI), program chain command table (PGC_CMDT), program chain program map (PGC_PGMAP) and cell position information table (C_POSIT) are included in the program chain information PGCI.

Inside the program chain general information PCGI_GI, following is described; the number of program and cell for the program chain (PCG content: PGC_CNT), all playback time intended by the program chain (PCG playback time: PGC_PB_TM), whether a program to be played by the program chain allows for a user operation, for example a code indicating whether it is possible to switch angle (PCG user operation control:PGC_UPR_CTL), whether an audio stream can be switched, a code indicating what kind of audio stream (for example linear PCM, AC-3 and MPEG) to be switched (PGC audio stream control table: PGC_AST_CTLI), whether subvideo can be switched, a code indicating what kind of subvideo (for example different aspect ratio) to be switched (PGC subvideo stream control table: PGC_SPST_CTLT), next and previous program chain numbers, whether a program intended by the program chain is continuous, random or shuffle playback (PGC navigation control: PGC_SP_PLI), a color specification indicating what color the subvideo should be displayed (PGC navigation control: PGC_NV_CTL), a start address of program chain command table (PGC_PGMAP_SA), start address of cell playback information table (C_PBIT_SA), and start address (C_POSI_SA) of cell position information.

Inside the program chain command table (PGC_CMDT), previous and next instructions of the program chain and cell instruction are described. The previous instruction is to be processed before executing the program chain whereas the next instruction is to be processed after executing the program chain. The previous and next instructions are used to determine a state in which a video title and audio is played and a played stream. The cell instruction is to be processed following an execution of a playback process of a cell.

A program structure intended by the program chain is indicated in a start address of the program chain program map (PGC_PGMAP) and an entry cell number of an existing program is described. In the cell playback information table (C_PBIT), information indicating an order to play cells intended by the program chain is described.

Further C_CAT included in the cell playback information (C_PBIT) is cell attribute information indicating a mode of a cell block. The mode of a cell block indicates whether the cell is a first or a last cell. Moreover the information concerning whether a seamless playback should be performed and whether a cell block is between interleaved blocks and seamless angle switch is included. The information concerning seamless angle switch indicates whether an angle can be switched seamlessly or not.

C_PBTM indicates cell playback time, C_FVOBU_SA indicates a start address for a first video object unit (VOBU) in a cell, C_ILVU_EA indicates an end address of a first interleaved unit (ILVU) in a cell, C_FVOBU_SA indicates a start address of a last video object unit (VOBU) in a cell and C_FVOBU_EA indicates an end address of a last video object unit (VOBU) in a cell. The addresses are described regarding a logical block number for a first logical block in VOBS that a cell belongs thereto. By referring to the cell playback information, an evaluation is performed whether the current playback state reaches an end of a cell. When the next cell is played, next playback information in the cell playback table is referred to determine a start address of a first VOBU (or an interleaved unit).

Then in video title set video object unit address map VTS_VOBU_ADMAP of the video title set information VTSI shown in FIGS. 5 and 6, the above first VOBU address C_FVOBU_SA and the last VOBU address C_LVOBU_SA are searched for to obtain their VOBU numbers (addresses) (steps S2 and S4). For example with VOBU number of the first VOBU address C_FVOBU_SA is m and VOBU number of the last VOBU address C_LVOBU_SA is n, the VOBU number Ma included in the corresponding title can be calculated by Ma=n−m (step S5).

The data configurations of video title set VTS and video title set information VTSIS are described hereinafter in detail. In the video title set (VTS), video title set information (VTSI) as control data, video object set (VTSTT_VOBS) for title of a video title set, which is a video object set for displaying video and backup video title set information (VTSI_BUP) having same content as VTSI are included. Video object set (VTSTT_VOBS) for displaying video is formed by a large number of cell. A cell identification number is assigned to each cell.

In video title set information (VTSI) inside video title set (VTS), video title set program chain information table (VTS_PGCIT) is described. When a video object set (VOBS) in one video title set (VTS) is played, among a large number of program chain provided in the video title set program chain information table (VTS_PGCIT), one specified by a manufacturer or one selected by a user is used.

Further, whether information of what kind exists in the video set title, video title set information management table (VTSI_MAT) having a start and an end address of each information item described therein, video title set title portion search pointer table (VTS_PTT_SRPT) having entry point or the like of a title described therein, and video title set menu program chain information unit table (VTS_PGCI_UT) having menus of the video title set in various languages described therein are described. The menu enables a user to determine what kind of video title set is described and in what order and style a title is played.

Further, following is described; video title set time map table (VTS_TMAPT) (not available in the DVD+RW standard as it is 0 fixed), video title set menu cell address table (VTSM_C_ADT) having a start and an end address for each cell with video title set menu or the like described therein, video title set video object unit address map (VTSM_VOBU_ADMAP) having a start address for each menu video object described therein and video title set cell address table (VTS_C_ADT) having cell address information described therein.

On the other hand the playback time retriever 11A retrieves the playback time Ta of a playback title shown in FIG. 3 from PCG playback time (PGC_PB_TM) included in program chain general information (PGC_GI) of program chain information (PGCI) (step S6).

In this way, the playback time retriever 11A sends the playback time of a title Ta to the playback controller 30 via the switch controller 20. Further, the VOBU number retriever 12A sends the calculated VOBU number Ma to the playback controller 30 via the switch controller 20. In this example, in response to a instruction for a time search, the switch controller 20 controls to switch so that the information from the search information retrieve 10A is sent to the playback controller 30.

The playback controller 30 calculates an average playback time t1 for one VOBU from the playback time Ta of the title and the number of VOBU Ma included in the title as unit playback time by t1=Ta/Ma (step S7). Further, a VOBU number to be played next is obtained by the calculated unit playback time t1 and time search specified time instructed externally using VTS_VOBU_ADMAP so as to carry out a time search (step S8).

With the unit playback time t1=0.5 s and the time search specified time is 1 minute and 30 seconds, the playback apparatus needs to know an address of a VOBU to be played from 1 minute and 30 seconds. In this case, the number of VOBU included in 1 minute and 30 seconds, which is 90 seconds, by 90/0.5=180. This finds out that the VOBU number after 1 minute and 30 seconds is 181th, so the 181th VOBU address is referred and obtained. Then the playback controller 30 enables to play from the time search specified time by playing from this address.

Figure 9:
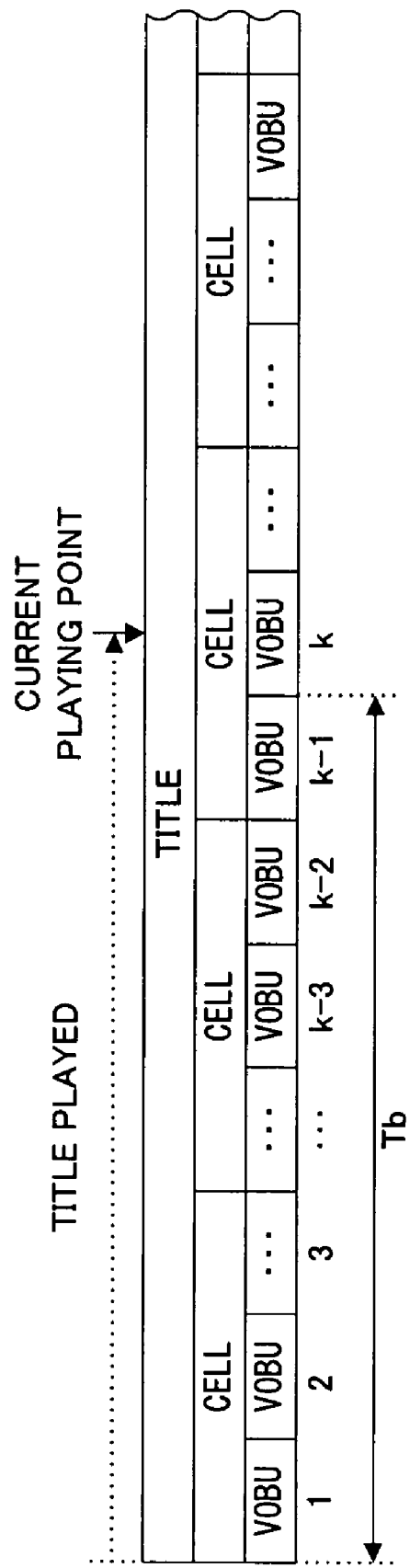
FIG. 9 is a view explaining playback time and the number of playback VOBU.
Figure 10:
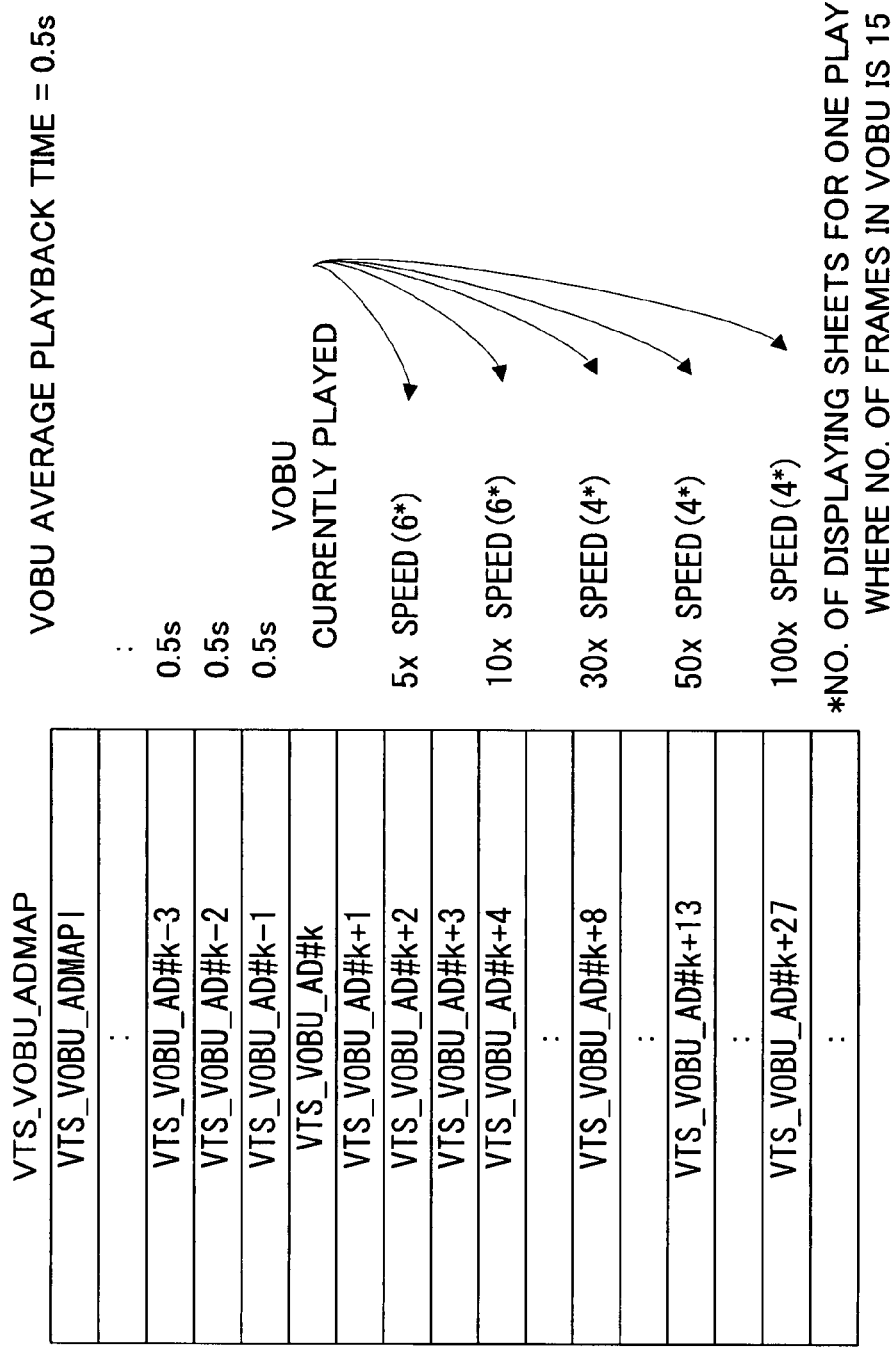
FIG. 10 is a view explaining a high-speed search using a unit playback time.
Figure 11:
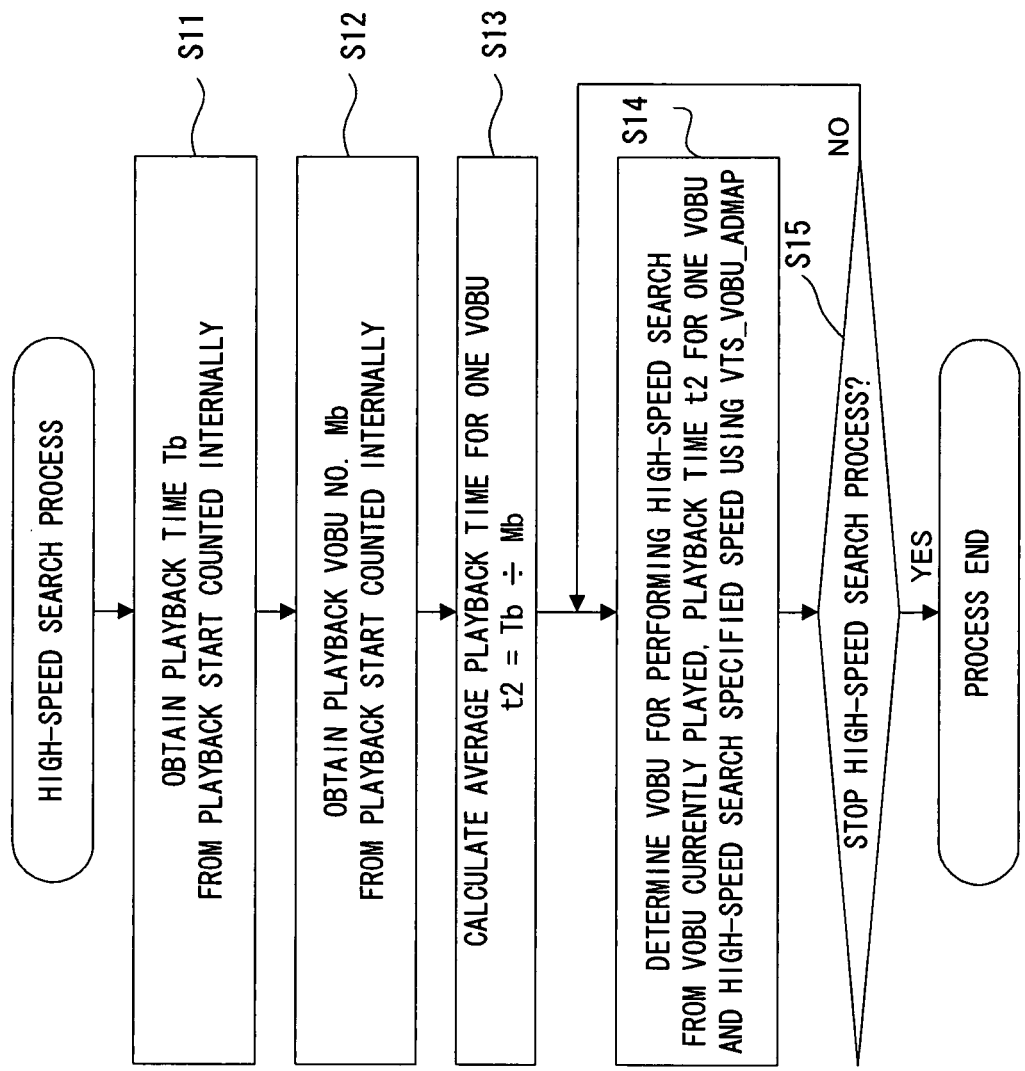
FIG. 11 is a flowchart illustrating a method for carrying out a high-speed search according to the embodiment of the present invention.
Figure 12:
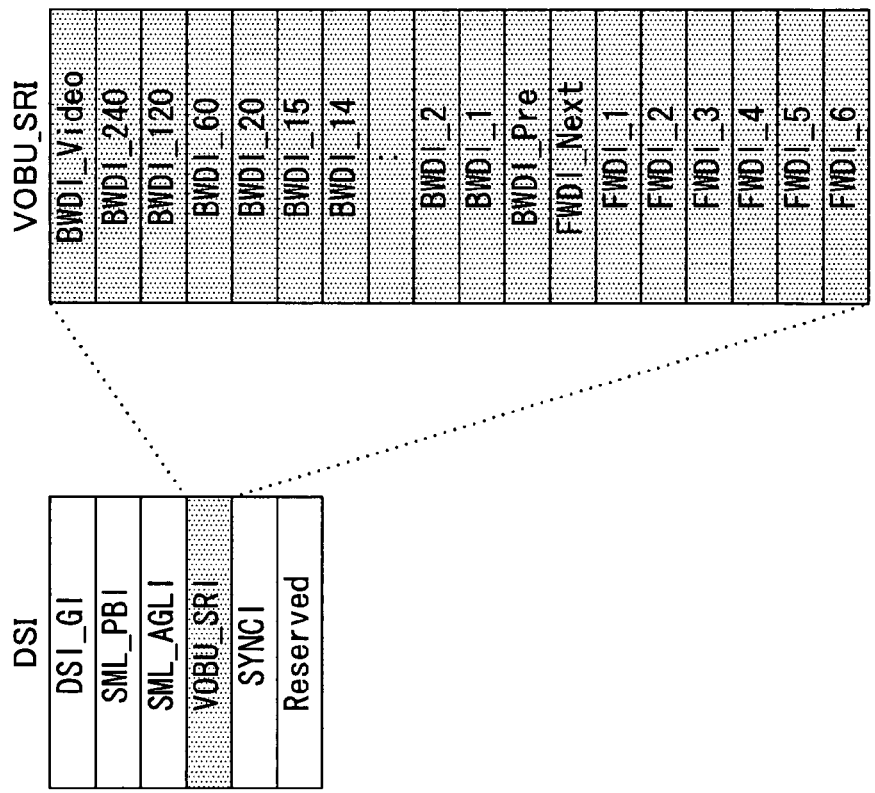
FIG. 12 is a view showing a data configuration of search information DSI.
Figure 13:
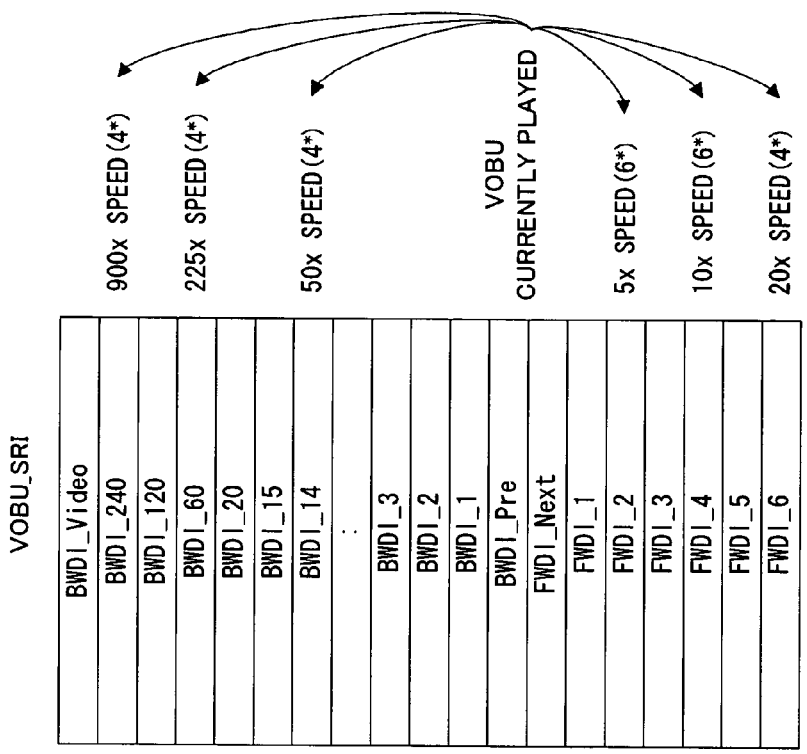
FIG. 13 is a view explaining a conventional high-speed searching method.
Figure 14:
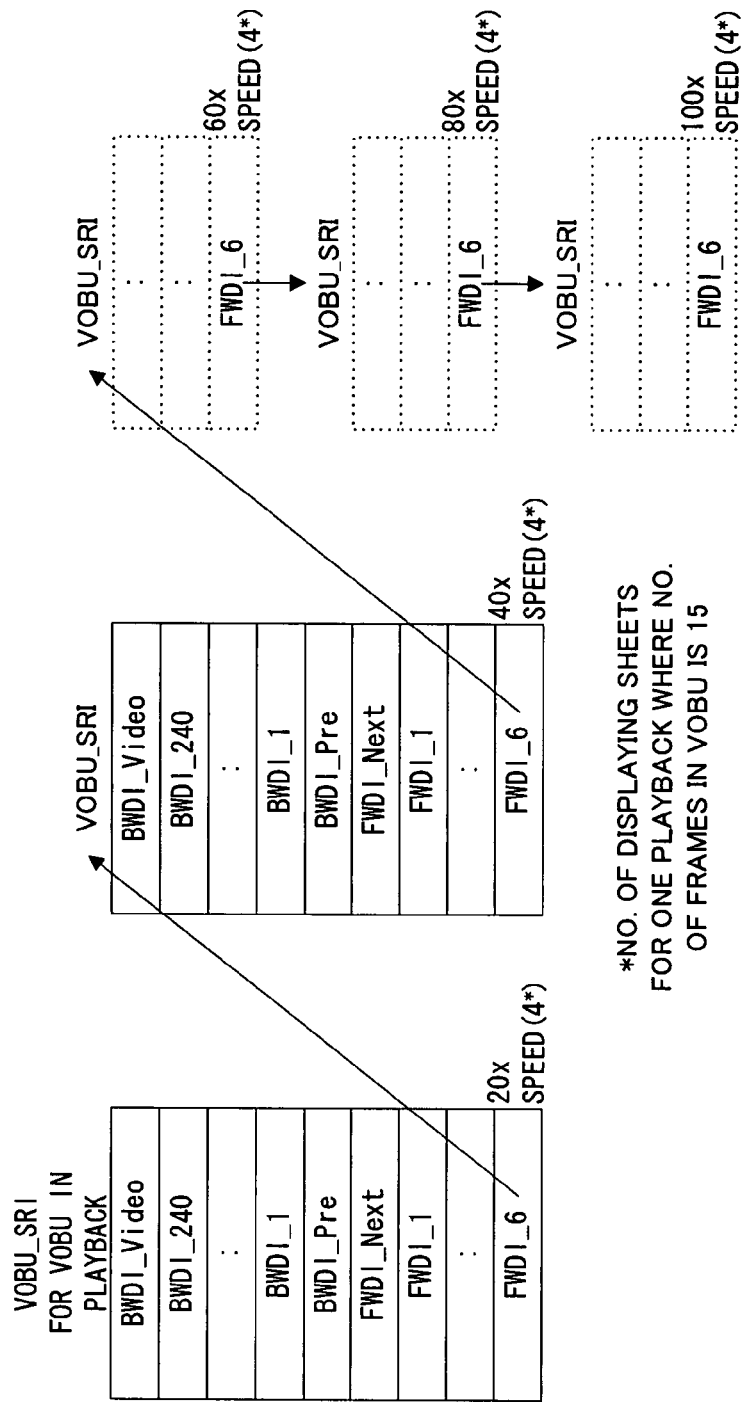
FIG. 14 is a view explaining a conventional high-speed searching method.
Figure 15:
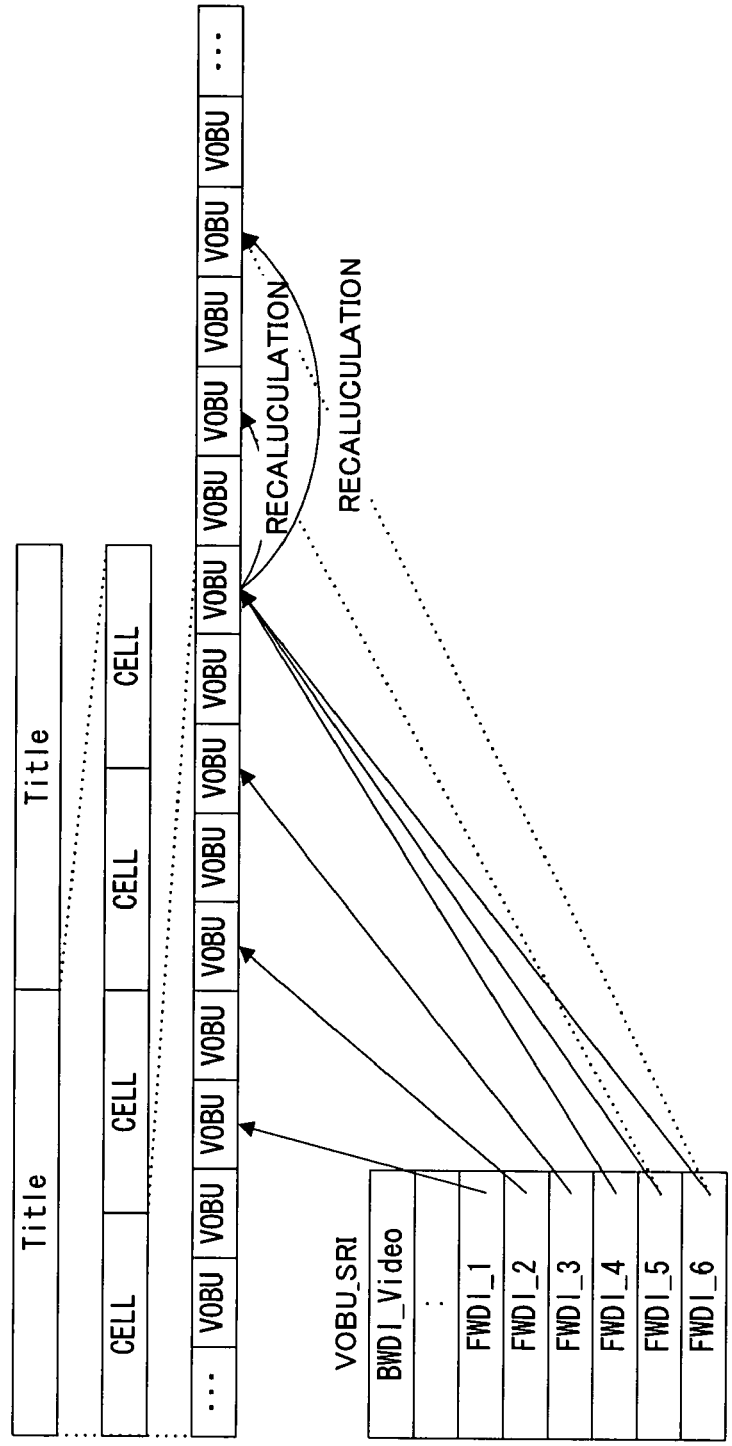
FIG. 15 is a view explaining a high-speed searching method when VOBU_SRI crosses over cells.
Figure 16:
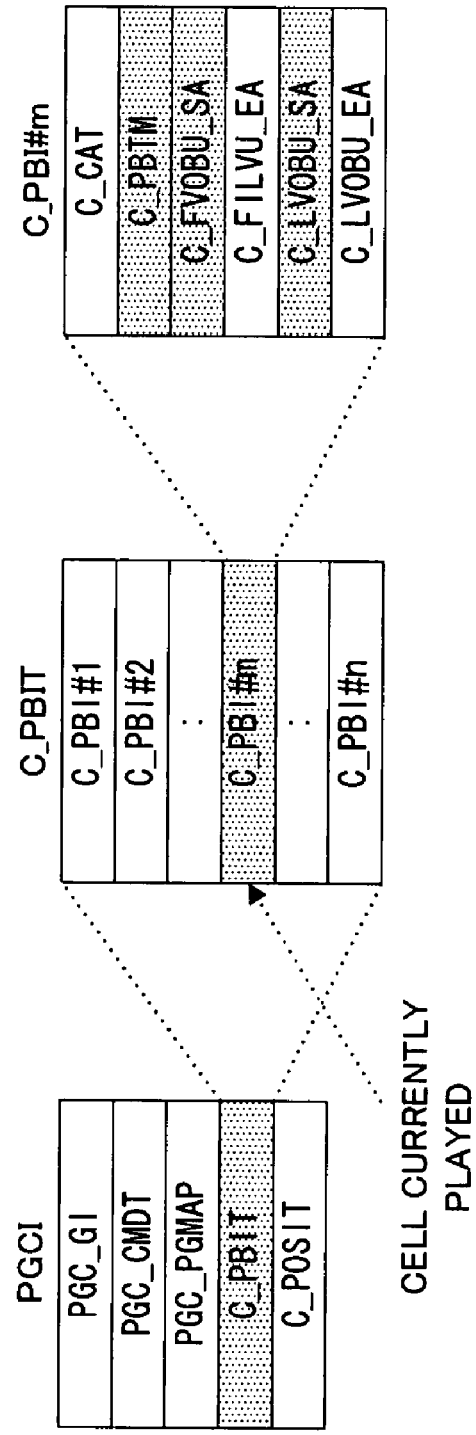
FIG. 16 is a view explaining a high-speed searching method disclosed in Japanese Unexamined Patent Application Publication No. 2005-521189.
Figure 17:
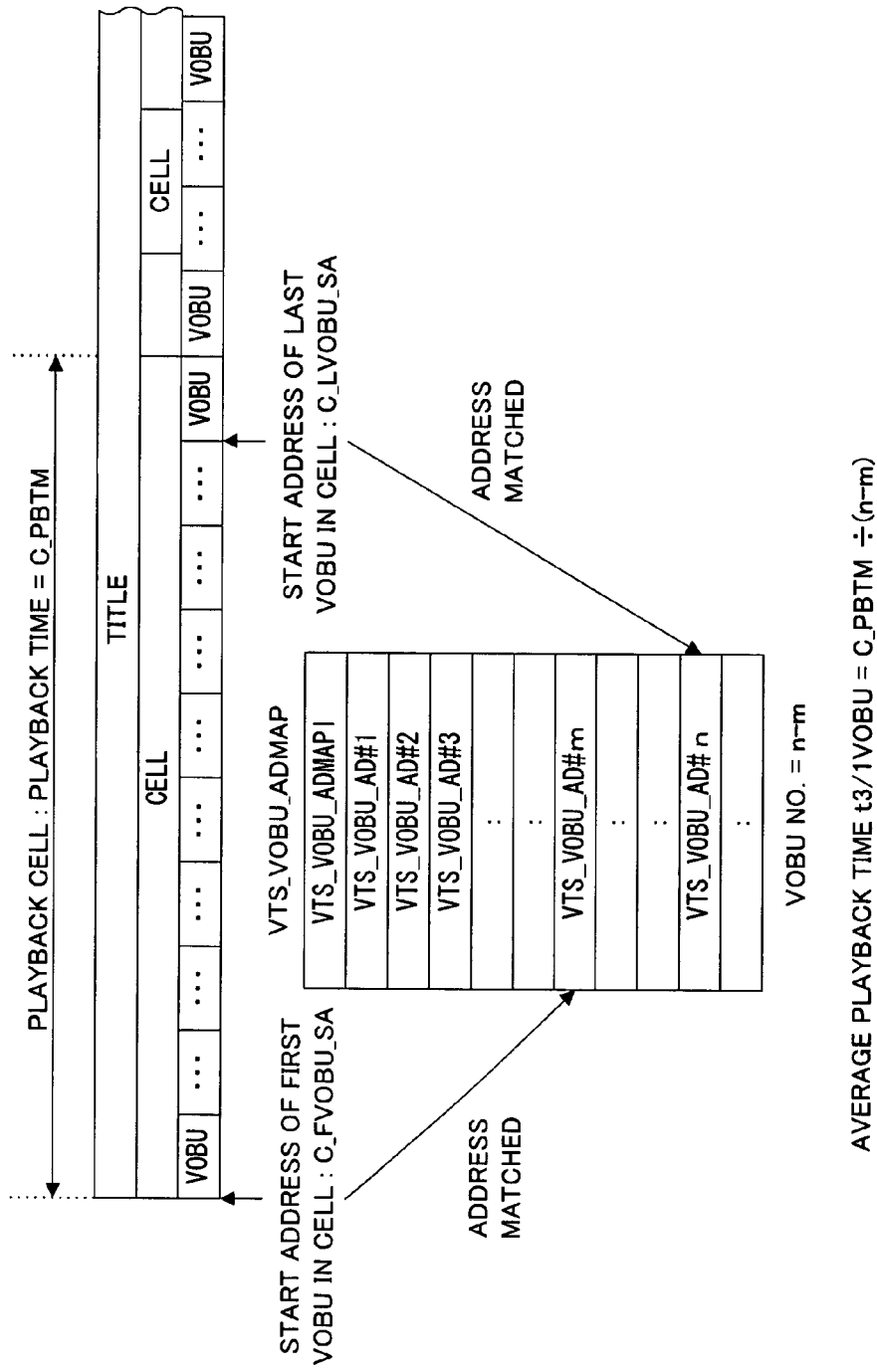
FIG. 17 is a view explaining a high-speed searching method disclosed in Japanese Unexamined Patent Application Publication No. 2005-521189.
Figure 18:
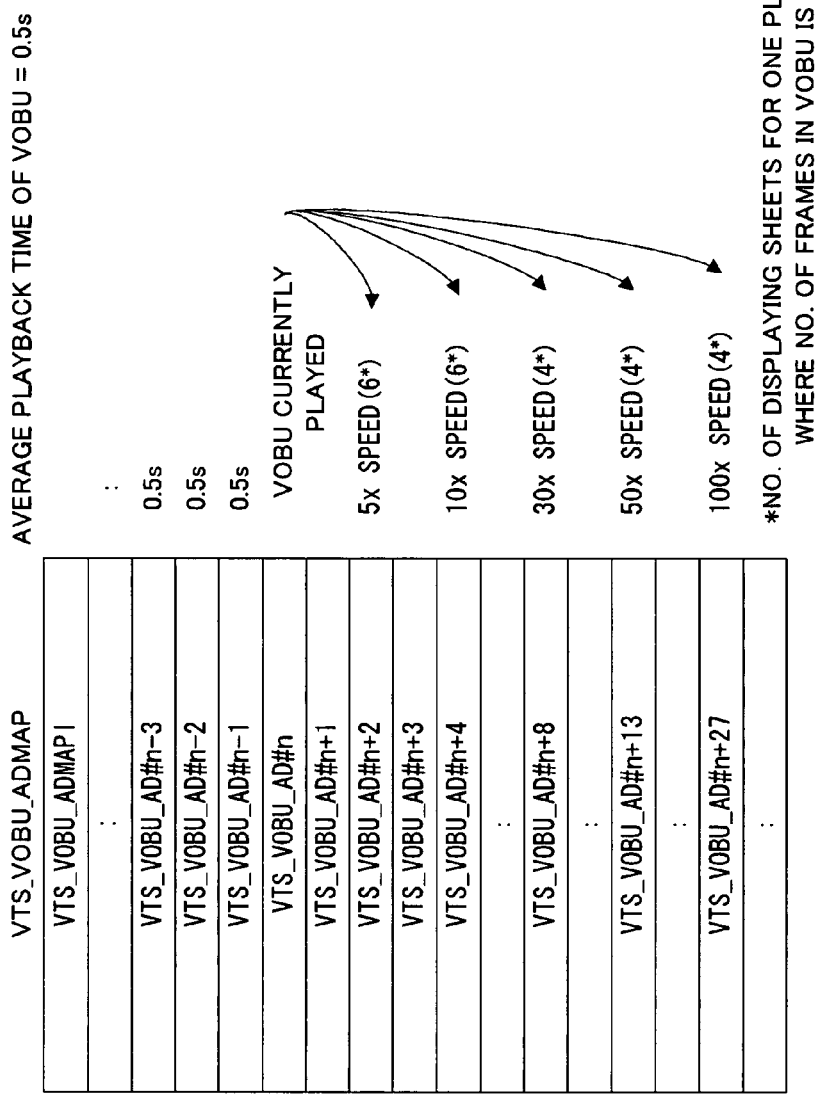
FIG. 18 is a view explaining a high-speed searching method disclosed in Japanese Unexamined Patent Application Publication No. 2005-521189.
Figure 19:
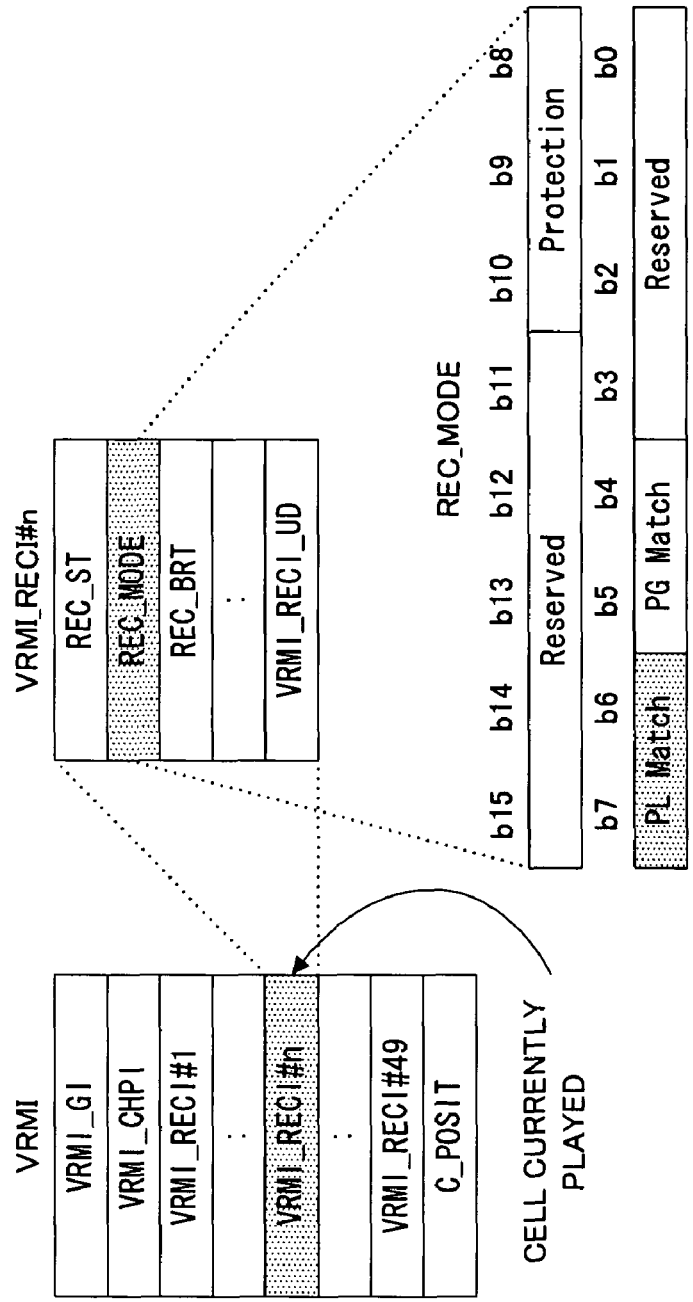
FIG. 19 is a view explaining PL match.

A high-speed searching process is described hereinafter in detail with reference to FIGS. 3 and 9 to 11. FIG. 9 is a view explaining playback time and the number of playback VOBU. FIG. 10 is a view explaining a high-speed search using unit playback time. FIG. 11 is a flowchart illustrating a method to carry out a high-speed search. In this example, for a high-speed search, the search information retriever 10B, switch controller 30 and playback controller 30 are used.

The playback time retriever 11B and VOBU number retriever 12B in the search information retriever 10B each has a counting means for counting playback time and the number of playback VOBU. Although a high-speed search is instructed during playback, the playback time retriever 11B and VOBU number retriever 12B always start counting the playback time and number of playback VOBU at the same time as a playback start.

Specifically as shown in FIG. 9, the playback time retriever 11B and VOBU number retriever 12B count the playback time and the number of playback VOBU (1, 2, ... k) until the position currently played. At this time, if there is an instruction for a high-speed search from outside, the playback time retriever 11B obtains playback time Tb from the counted playback start (step S11). Likewise, the VOBU number retriever 12B obtains the number of playback VOBU Mb (=k) that is counted from the playback start (step S12).

The playback time retriever 11B sends the playback time Tb of a title to the playback controller 30 via the switch controller 20. Further, the VOBU number retriever 12B sends the calculated VOBU number Mb to the playback controller 30 via the switch controller 20. In this example, in response to an instruction for a high-speed search, the switch controller 30 controls to switch so that the information from the search information retrieve 10B is sent to the playback controller 30.

The playback controller 30 calculates the average playback time t2=Ta/Ma for one VOBU as unit playback time from the playback time Tb up to then and the number of playback VOBU Mb played up to then (step S13). Then a VOBU address to be played next is obtained to execute a high-speed search according to the VOBU currently being played, the calculated unit playback time t2 and a high-speed search speed specified externally using VTS_VOBU_ADMAP (step S14).

For example a case is described hereinafter in detail where the unit average time t2 for one VOBU is 0.5 second and the number of frame in one VOBU is 15. In this case, one second is made up of 30 frames. When instructed for a 5× high-speed search, if displaying 6 frames for one playback, it needs to play once in 2 VOBUs (30 frames). That is, 5× playback is accomplished by playing 30 frames by 6 frames. In this case as shown in FIG. 10, assuming that the VOBU number currently being played to be #k, VOBU is accessed in the order of #k+2, #k+4, #k+6, ... and played by 6 frames. Accordingly the playback controller 30 obtains the address of #k+2, #k+4, #k+6 ... by referring to VTS_VOBU_ADMAP so as to carry out a high-speed search.

Likewise, to accomplish 10× speed by displaying 6 frames in one playback, it needs to be played once in 4 VOBUs (which is 60 frames). Further, to accomplish 30× speed by playing 4 frames in one playback, it needs to be played by 8 VOBUs (which is 120 frames). Likewise, to accomplish 50× and 100× speeds by playing 4 frames, it needs to be played by 13 VOBUs (which is 195 frames) and 27 VOBUs (which is 405 frames) respectively. Note that to accomplish 50× and 100× speeds by 4 frames each, it is precisely played by 200 and 400 frames respectively, however playing by 13 VOBUs and 27 VOBUs respectively that are closest to the 200 and 400 frames, approximately 50× and 100× high-speed search can be accomplished.

In this embodiment, it has been explained that the VOBU number retriever 12B is provided to calculate the average unit playback time t2 according to the playback time and the number of playback VOBU from the playback start timing, however only the playback time for one VOBU needs to be measured. Specifically, instead of the playback start therefrom, the playback time and the number of playback VOBU can be obtained at any timing after playback has started and playback unit time may be calculated in advance by the playback controller 30. In such case, a high-speed search can be immediately started when instructed to perform a high-speed search. Further, as playback time for one VOBU needs to be obtained, the playback time retriever 11B may measure the playback time for one VOBU. In this case, the VOBU number retriever 12B is not required and the playback controller 30 is able to carry out a high-speed search using the playback time (unit playback time) for one VOBU as is that is supplied from the playback time retriever 11B. The playback time for one VOBU is for instance about 0.5 second and it can be performed after instructing for a high-speed search.

In this embodiment, special playbacks such as a time search and high-speed search can be carried out only with the information defined in the DVD+RW standard. Especially for a time search, a video can be played at any time specified in a title whereas for a high-speed search, any speed of search can be processed.

In accordance with the mode of special playback, it is possible to switch between whether to calculate or measure unit playback time to execute. For example, a time search is instructed during stop, thus the processing time from the instruction to an execution can be reduced by calculating playback time and the number of VOBU of a title. In a high-speed search instructed during playback, a high-speed search based on an accurate unit playback time can be carried out by counting the playback time and the number of playback VOBU in advance so as to calculate average unit playback time.

Further, as in a conventional technique, when attempting to calculate the unit playback time from the playback time of a cell and the number of VOBU included in the cell, the unit playback time for one VOBU needs to be estimated using PGCI of play list title. In such case as discussed above, with an invalid PL match, the unit playback time cannot be estimated or an accurate unit playback time cannot be obtained, thereby not being able to carry out special playbacks. Whereas in this embodiment, as the unit playback time for one VOBU is obtained by the information defined in the DVD+RW standard or by a measurement, special playbacks can be carried out even if a full title does not match the play list.

Furthermore in this embodiment, although it has been explained that for a high-speed search instructed while playback the search information retriever B and the unit playback time t2 are used, where the unit playback time is calculated from actual playback time, for a time search instructed during stop, the unit playback time t1 is used, where the unit playback time is calculated by reading out playback time and the number of VOBU of a title, it is not limited to this. When instructed to carry out a high-speed search during playback, the search information retriever 10A reads out the playback time and the number of VOBU of a title and a high-speed search may be carried out by referring to VTS_VOBU_ADMAP based on the unit playback time. Conversely when instructed for a time search during stop, for example the playback time for one VOBU is measured by the search information retriever 10B so as to carry out a time search by referring to VTS_VOBU_ADMAP according to the unit playback time.

It is apparent that the present invention is not limited to the above embodiment and it may be modified and changed without departing from the scope and spirit of the invention.

What is claimed is:

1. A playback apparatus comprising:
 a playback unit number retriever to obtain the number of playback unit included in a title recorded on a media; and
 a playback controller to carry out a special playback according to the number of playback unit and the playback time, which obtains average playback time for the playback unit according to the playback time and the number of playback unit for the title as unit playback time to carry out a special playback according to the playback time.

2. The playback apparatus according to claim 1, wherein the playback unit number retriever obtains the number of playback unit included in the title according to an address of a first playback unit and an address of a last playback unit in the title.

3. A playback apparatus comprising:
 a playback time retriever to obtain playback time for a playback unit in a title recorded on a media and count playback time for one or more playback unit; and
 a playback controller to carry out a special playback according to the result of the playback time retriever, which carries out the special playback based on unit playback time which is playback time for one playback unit counted by the playback time retriever.

4. The playback apparatus according to claim 3, further comprising:
 a playback unit number retriever to obtain the number of playback unit included in the playback time obtained by the playback time retriever,
 wherein the playback time retriever counts playback time from a predetermined timing between a playback start and after playback start,
 the playback unit number retriever counts the number of playback unit from a point the playback time retriever started to count, and
 the playback controller obtains average playback time for the playback unit according to the playback time counted by the playback time retriever and the number of playback unit counted by the playback unit number retriever as the unit playback time.

5. The playback apparatus according to claim 1, wherein the playback controller calculates the number of playback unit to skip from the unit playback time and a search speed specified externally and carries out a high-speed search.

6. The playback apparatus according to claim 2, wherein the playback controller calculates the number of playback unit to skip from the unit playback time and a search speed specified externally and carries out a high-speed search according to the calculation result.

7. The playback apparatus according to claim 1, wherein the playback controller starts playing back at playback start time specified externally according to the unit playback time.

8. The playback apparatus according to claim 2, wherein the playback controller starts playing back at playback start time specified externally according to the unit playback time.

9. The playback apparatus according to claim 1, further comprising:
 a first search information retriever to obtain the playback time and the number of playback unit; and
 a second search information retriever to obtain the playback time and the number of playback unit by a method different from the first search information retriever,
 wherein the playback controller receives the playback time and the number of playback unit from the first or the second search information retriever according to a special playback mode and obtains the unit playback time according to the playback time and the number of playback unit to carry out the special playback.

10. The playback apparatus according to claim 9, wherein the first search information retriever comprises:
 a first playback unit number retriever to retrieve a playback unit number included in a title according to an address of a first playback unit and an address of a last playback unit in a title; and
 a first playback time retriever to obtain playback time for the title,
 wherein the second search information retriever comprises:
 a second playback unit number retriever to obtain the number of playback unit from a playback start by counting the number of playback unit played up to then; and
 a second playback retriever to obtain playback time from the playback start by counting playback time played up to then.

11. The playback apparatus according to claim 1, wherein the playback controller is to play data recorded on a disk, and play a title or a play list edited according to an external instruction.

12. The playback apparatus according to claim 1, wherein the playback controller controls the special playback according to a smallest playback unit and an address map thereof.

13. The playback apparatus according to claim 12, wherein the playback unit number retriever obtains a first address and a second address and refers to the address map to obtain the number of smallest playback unit included in the first and second addresses, the first address being a start address in a first smallest playback unit in the title and the second address being a start address in a last smallest playback unit in the title.

14. The playback apparatus according to claim 12, wherein the playback time retriever counts the playback time from a playback start, and
 the playback unit number retriever counts a number of smallest playback unit from the playback start.

15. A method for playing a special playback comprising:
 obtaining the number of playback unit included in a title according to an address for a first playback unit and an address for a last playback unit in the title recorded on a media;
 obtaining playback time of the title; and
 obtaining average playback time for the playback unit from the playback time and the number of playback unit of the title as unit playback time to carry out a special playback by referring to an address map for the playback unit according to the unit playback time.

16. A method for playback comprising:
 counting playback time from a predetermined timing between a playback start to after the playback start of a title;

counting the number of playback unit constituting the title included in the playback time at the same time as the counting of the playback time;

obtaining average playback time for the playback unit from the counted playback time and the number of playback unit as unit playback time and carrying out a special playback by referring to an address map of the playback unit.

17. The method according to claim 15, further comprising:
calculating the number of playback unit to skip according to the unit playback time and a search speed specified externally to carry out a high-speed search according to the calculation result.

18. The method according to claim 16, further comprising:
calculating the number of playback unit to skip according to the unit playback time and a search speed specified externally to carry out a high-speed search according to the calculation result.

19. The method according to claim 15, further comprising:
starting to play at playback start time specified externally according to the unit playback time.

20. The method according to claim 16, further comprising:
starting to play at playback start time specified externally according to the unit playback time.

\* \* \* \* \*